(12) United States Patent
An et al.

(10) Patent No.: US 9,714,008 B2
(45) Date of Patent: *Jul. 25, 2017

(54) FLAT WIPER BLADE AND COUPLING METHOD THEREOF

(71) Applicant: KBWS Corporation, Daegu (KR)

(72) Inventors: Jae-Hyuck An, Daegu (KR); Jin-Wan Park, Daegu (KR)

(73) Assignee: KBWS CORPORATION, Daegu (KR)

( * ) Notice: Subject to any disclaimer, the term of this patent is extended or adjusted under 35 U.S.C. 154(b) by 198 days.

This patent is subject to a terminal disclaimer.

(21) Appl. No.: 14/300,956

(22) Filed: Jun. 10, 2014

(65) Prior Publication Data

US 2015/0059116 A1    Mar. 5, 2015

(30) Foreign Application Priority Data

Sep. 3, 2013  (KR) .................. 10-2013-0105272

(51) Int. Cl.
*B60S 1/38* (2006.01)

(52) U.S. Cl.
CPC ........... *B60S 1/3851* (2013.01); *B60S 1/3858* (2013.01); *B60S 1/3881* (2013.01); *B60S 1/381* (2013.01); *B60S 2001/3818* (2013.01); *B60S 2001/3898* (2013.01); *Y10T 29/49826* (2015.01)

(58) Field of Classification Search
CPC .... B60S 1/3858; B60S 1/3881; B60S 1/3856; B60S 1/3851; B60S 1/3853
See application file for complete search history.

(56) References Cited

U.S. PATENT DOCUMENTS

| | | | |
|---|---|---|---|
| 7,587,783 B1 * | 9/2009 | Lin ....................... | B60S 1/3858 15/250.201 |
| 9,120,463 B2 * | 9/2015 | Kim ...................... | B60S 1/3858 |
| 2008/0201894 A1 * | 8/2008 | Ko ........................ | B60S 1/3858 15/250.201 |
| 2013/0192016 A1 * | 8/2013 | Kim ...................... | B60S 1/3858 15/250.201 |

FOREIGN PATENT DOCUMENTS

| | | |
|---|---|---|
| CN | 103223923 A | 8/2013 |
| KR | 10-1126713 B1 | 3/2012 |
| WO | WO 2013/089312 A1 | 6/2013 |

OTHER PUBLICATIONS

Korean Intellectual Property Office, Office Action, Korean Patent Application No. 10-2013-0105272, Sep. 19, 2014, four pages [with concise explanation of relevance in English].

(Continued)

*Primary Examiner* — Andrew A Horton
(74) *Attorney, Agent, or Firm* — Fenwick & West LLP

(57) ABSTRACT

A flat wiper blade may be provided that includes: a wiper strip 10 which wipes the wiping surface; a seating part 100 including a first fitting protrusion 134 and a catching portion 135; a guide spring 30 which supports the wiper strip 10, to which the seating part 100 is coupled in an attachable and removable manner and which includes a first fitting recess 34 allowing the first fitting protrusion 134 to be inserted into a central portion 32 of the guide spring 30; and a first and a second spoiler 41 and 42 which are coupled to the guide spring 300. The catching portion 135 is caught by the first fitting recess 34.

6 Claims, 8 Drawing Sheets

(56) References Cited

OTHER PUBLICATIONS

Office Action for German Patent Application No. DE 102014110469.2, Aug. 11, 2015, 4 Pages (With Concise Explanation of Relevance).
Office Action for Chinese Patent Application No. CN 201410363158.5, Jan. 27, 2016, 7 Pages. (With Concise Explanation of Relevance).

* cited by examiner

FLAT WIPER BLADE AND COUPLING METHOD THEREOF

CROSS-REFERENCE TO RELATED APPLICATION

The application claims priority to Korean Patent Application No. 10-2013-0105272 filed on Sep. 3, 2013, which is incorporated by reference herein in its entirety.

BACKGROUND

Field

The present invention relates to a flat wiper blade and a coupling method thereof.

Description of Related Art

In general, a wiper blade removes impurities, snow, rain or the like when driving and prevents a driver's front sight from being deteriorated. As a motor drives a link apparatus connected to a wiper arm, the wiper blade performs a repetitive reciprocating action in a fan shape.

The wiper blade includes a long wiper strip in contact with a glass surface and a guide spring which maintains and supports the wiper strip in a longitudinal direction of the wiper strip. The wiper blade including the guide spring is known as a "conventional" wiper blade in the art. Recently, a wiper blade is being employed which makes use of one guide spring curved at a predetermined curvature and formed in the form of a long thin bar. Such a wiper blade is known as a flat wiper blade or a flat-bar wiper blade in the art.

As compared with the "conventional" wiper blade, the flat wiper blade has a less height and receives less air resistance. With a uniform load, the flat wiper blade is also able to cause the wiper strip to contact with the glass surface. A flat wiper blade assembly including the flat wiper blade includes an adaptor disposed in the central portion of the guide spring. The flat wiper blade assembly is connected to a wiper arm such that the adaptor is separably connected to the end portion of the wiper arm.

Among the existing flat wiper blades, there is a flat wiper blade in which the guide spring and a seating part are coupled to each other by using a plurality of recesses or holes formed in the central portion of the guide spring. In such a flat wiper blade, for the purpose of coupling the seating part and the guide spring, a recess or hole is formed in the central portion of the guide spring in such a manner as to in correspondence with a protrusion formed on the seating part. When a curvature is formed in the guide spring, stress of the guide spring is reduced due to the recess or hole. Here, the stress means a resistance force generated inside an object by an external force.

Therefore, there is a need to research a flat wiper blade capable of minimizing the recess or hole of the central portion of the guide spring.

SUMMARY

One embodiment is a flat wiper blade that includes: a wiper strip 10 which wipes the wiping surface; a seating part 100 including a first fitting protrusion 134 and a catching portion 135; a guide spring 30 which supports the wiper strip 10, to which the seating part 100 is coupled in an attachable and removable manner and which includes a first fitting recess 34 allowing the first fitting protrusion 134 to be inserted into a central portion 32 of the guide spring 30; and a first and a second spoiler 41 and 42 which are coupled to the guide spring 300. The catching portion 135 is caught by the first fitting recess 34.

A pair of the catching portions 135 may be provided and are formed separately from each other.

The catching portions 135 may be formed to face each other.

The first fitting recess 34 may be located in the middle of the guide spring 30.

The catching portion 135 may be elastically caught by the first fitting recess 34.

The seating part 100 further include a second fitting protrusion 133, and the guide spring 30 may further include a second fitting recess 33 into which the second fitting protrusion 133 is inserted.

The size of the second fitting recess 33 may be less than that of the first fitting recess 34.

The seating part 100 may further include a second fitting protrusion 133, and the guide spring 30 may further include a second fitting recess 33 into which the second fitting protrusion 133 is inserted, and the size of the second fitting protrusion 133 may be less than that of the first fitting protrusion 134.

Another embodiment is a flat wiper blade that includes: a wiper strip 10 which wipes the wiping surface; a seating part 100 including a catching portion 135; a guide spring 30 which supports the wiper strip 10, to which the seating part 100 is coupled in an attachable and removable manner and which includes a first fitting recess 34 formed in both sides of a central portion 32; and a first and a second spoiler 41 and 42 which are coupled to the guide spring 30. The catching portion 135 is caught by the first fitting recess 34.

A pair of the catching portions 135 may be provided and are formed separately from each other.

The catching portions 135 may be formed to face each other.

The first fitting recess 34 may be located in the middle of the guide spring 30.

The catching portion 135 may be elastically caught by the first fitting recess 34.

The seating part 100 may further include a second fitting protrusion 133, and the guide spring 30 may further include a second fitting recess 33 into which the second fitting protrusion 133 is inserted.

The size of the second fitting recess 33 may be less than that of the first fitting recess 34.

The seating part 100 may further include a first fitting protrusion 134, and the first fitting protrusion 134 may be inserted into the first fitting recess 34.

The seating part 100 may further include a second fitting protrusion 133, and the guide spring 30 may further include a second fitting recess 33 into which the second fitting protrusion 133 is inserted, and the size of the second fitting protrusion 133 may be less than that of the first fitting protrusion 134.

Further another embodiment is a method for coupling a guide spring 30 to a seating part 100 in a flat wiper blade. The method includes: inserting a first fitting protrusion 134 of the seating part 100 into a first fitting recess 34 of the guide spring 30; causing the seating part 100 and the guide spring 30 to be in close contact with each other; and causing a catching portion 135 of the seating part 100 to be caught by the first fitting recess 34.

The causing the seating part 100 and the guide spring 30 to be in close contact with each other may mean that when the seating part 100 and the guide spring 30 come in close contact with each other, the catching portion 135 is elastically transformed upward.

The causing the catching portion 135 of the seating part 100 to be caught by the first fitting recess 34 may mean that the seating part 100 moves in a direction in which the catching portion 135 of the seating part 100 is inserted into the first fitting recess 34, so that the catching portion 135 is caught by the first fitting recess 34.

DETAILED DESCRIPTION

An embodiment of the present invention will be described in detail with reference to the accompanying drawings. In the components of the present invention, detailed descriptions of what can be clearly understood and easily carried into practice through a prior art by those skilled in the art will be omitted to avoid making the subject matter of the present invention unclear.

Embodiment

Hereafter, first, the overall structure of a flat wiper blade assembly 1 will be described.

Figure 1:
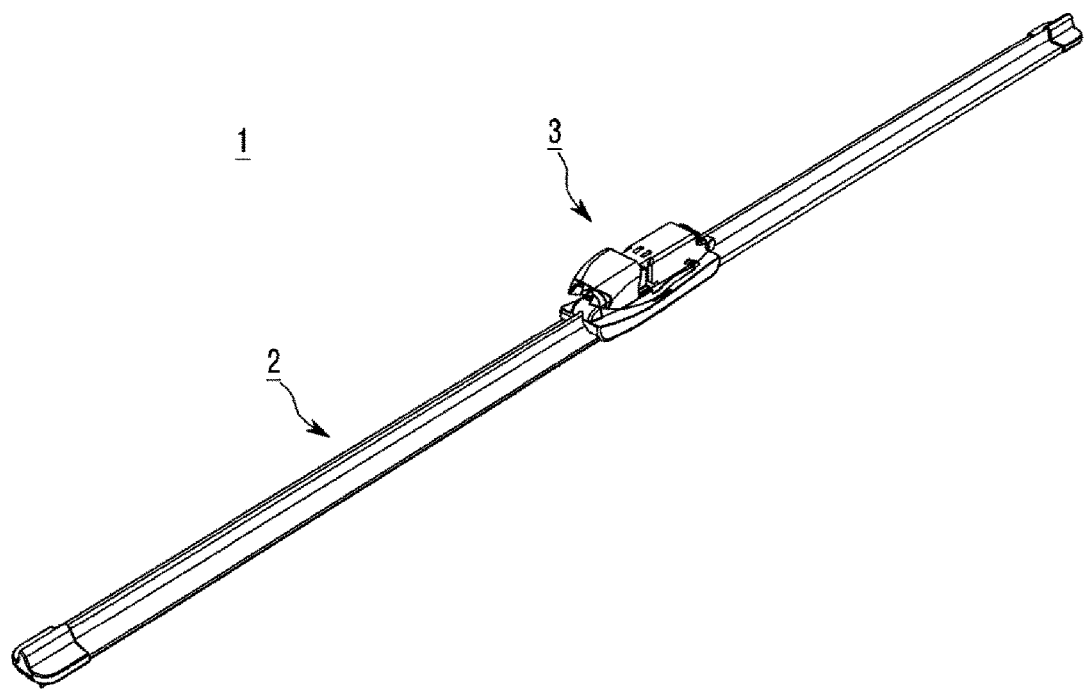
FIG. 1 is a perspective view showing an overall configuration of a flat wiper blade assembly.
Figure 2:
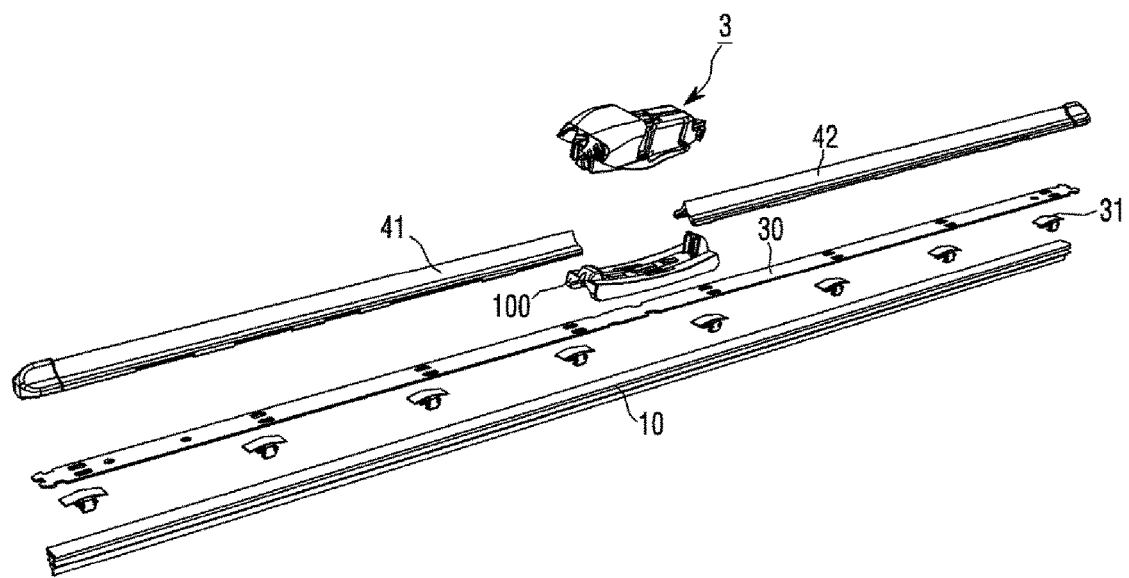
FIG. 2 is an exploded perspective view showing that the flat wiper blade assembly of FIG. 1 has been disassembled.

FIG. 1 is a perspective view showing an overall configuration of the flat wiper blade assembly. FIG. 2 is an exploded perspective view showing that the flat wiper blade assembly of FIG. 1 has been disassembled.

As shown in FIG. 1, the flat wiper blade assembly 1 according to the present invention includes a flat wiper blade 2 contacting closely with the glass surface of a vehicle and includes an adaptor 3 assembled to the central portion of the flat wiper blade 2 so as to connect the flat wiper blade 2 to a wiper arm (not shown).

Hereafter, the flat wiper blade 2 will be described in detail.

As shown in FIGS. 1 and 2, the flat wiper blade 2 includes the wiper strip 10 which contacts closely with and wipes the glass surface of the vehicle, a guide spring 30 which is disposed on the wiper strip 10 and supports the wiper strip 10, a first spoiler 41 and a second spoiler 42 which are coupled to the guide spring 30, and a seating part 100 for coupling the adaptor 3 to the guide spring 30.

The flat wiper blade 2 is connected to the front end of the wiper arm and receives a pressing force from the wiper arm with respect to the glass surface of the vehicle. The wiper arm rotates reciprocatively at a predetermined angle by a wiper motor (not shown). Accordingly, the flat wiper blade 2 wipes the glass surface (wiping surface) of the vehicle within the predetermined angle.

Figure 3A:
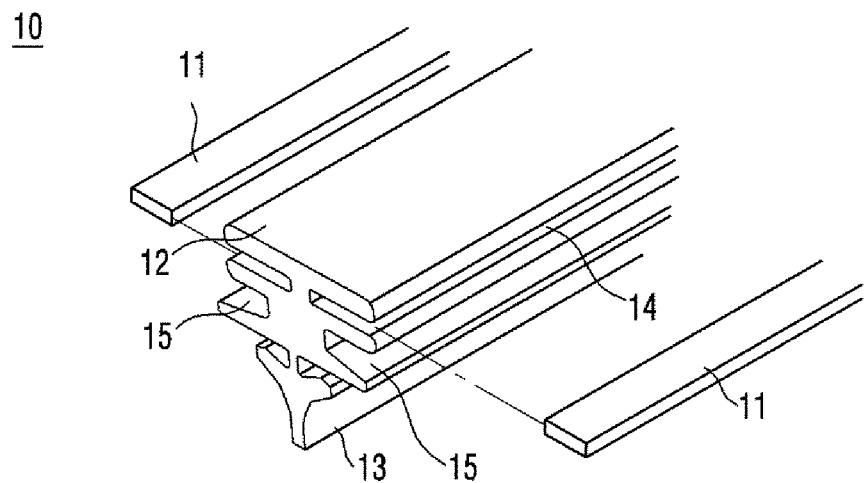
FIGS. 3a and 3b are perspective views showing one end and the other end of a wiper strip of FIG. 2 respectively.
Figure 3B:
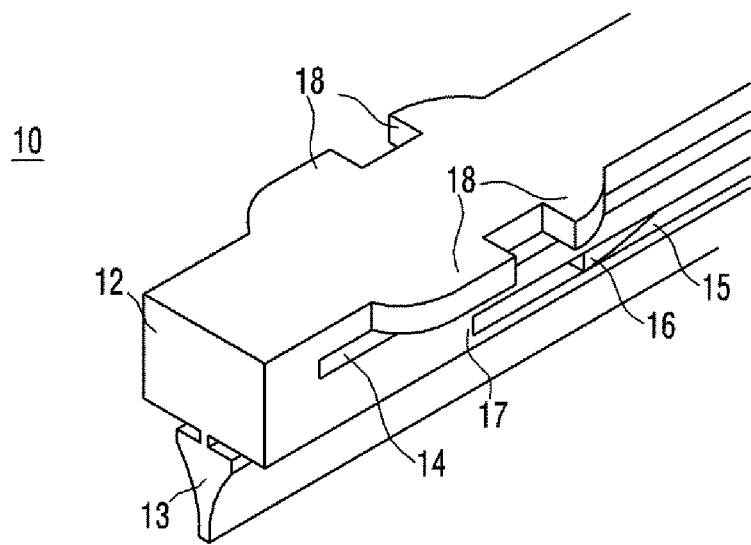

FIGS. 3a and 3b are perspective views showing one end and the other end of the wiper strip of FIG. 2 respectively.

As shown in FIGS. 2, 3a and 3b, the wipers strip 10 includes a base 12 which is supported by the guide spring 30 and includes a wiping lip 13 which is disposed under the base 12 and contacts directly with and wipes the glass surface. The wiper strip 10 has a long thin shape in the major axial direction of the flat wiper blade 2 and is made of an elastic material like a rubber material or made of an elastic composite material. The wiper strip 10 is disposed to contact with the glass of the vehicle in a sliding manner and removes impurities of the glass surface.

The base 12 is supported by a fastener 31 of the guide spring 30. The fastener 31 may have a yoke shape. The base 12 and the wiping lip 13 continuously extend in the longitudinal direction of the wiper strip 10.

The wiper strip 10 may further include a backing plate 11. A receiving recess 14 in which the two parallel backing plates 11 are received extends in the base 12 in a longitudinal direction thereof. The two rectangular metallic backing plates 11 having spring characteristics are received in the receiving recess 14 respectively.

Also, a holding portion 15 in which the fastener 31 is received in a sliding manner extends in the base 12 in the longitudinal direction thereof. Here, while the holding portion 15 at one end of the wiper strip 10 is open so as to receive the below-described fastener 31, the holding portion 15 at the other end of the wiper strip 10 is closed to limit the movement of the fastener 31.

The holding portion 15 formed at the other end of the wiper strip 10 includes a slope 16 and a wall 17 formed at the end of the holding portion 15. Also, the base 12 of the wiper strip 10 includes at least one protrusion 18 formed on the upper side thereof.

The backing plate 11 applies elasticity and rigidity to the wiping lip 13. When a pressing force is applied from the wiper arm, the pressing force is distributed to the wiper strip 10 through the guide spring 30. Here, the pressing force is distributed in the longitudinal direction of the wiper strip 10 by the backing plate 11. Accordingly, the backing plate 11 should have elasticity and rigidity to maintain the shape of the wiper strip 10. A plurality of the backing plates 11 and a plurality of the backing plate receiving recesses 14 may be provided according to the degree of the rigidity or elasticity of the wiper strip 10.

Hereafter, the guide spring 30 and the seating part 100 will be described in detail.

Figure 4:
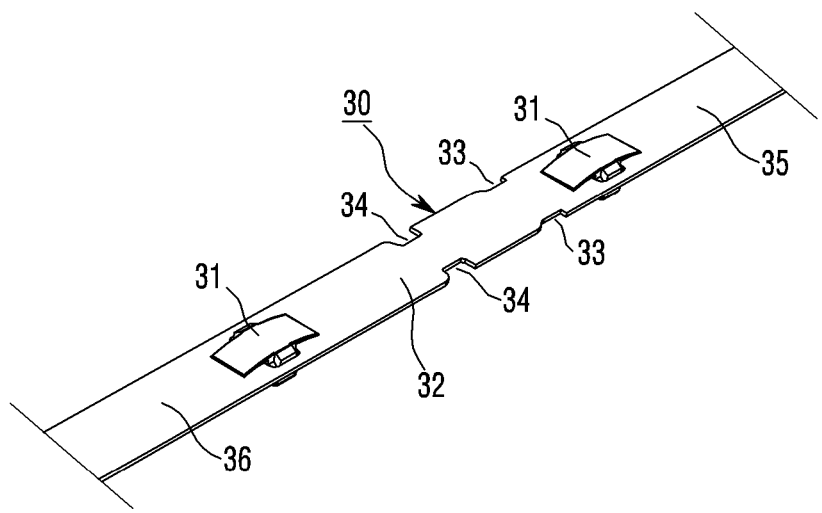
FIG. 4 is a perspective view showing a guide spring of FIG. 2.

FIG. 4 is a perspective view showing a guide spring of FIG. 2.

Referring to FIGS. 2 and 4, the guide spring 30 has a long thin shape in the major axial direction of the flat wiper blade 2 and includes a first and a second side portion 35 and 36 which are located on both ends thereof, a central portion 32 located approximately in the center between the first and second side portion 35 and 36. The first and second spoilers 41 and 42 are coupled to the first and second side portions 35 and 36 of the guide spring 30 respectively. The seating part 100 is coupled to the central portion 32 of the guide spring 30 in an attachable and removable manner.

Here, recesses are formed in the first and second side portion 35 and 36 at a predetermined interval, so that the fastener 31 can be inserted and fixed into the recess from the top surface to the bottom surface of the guide spring 30. However, the separate fastener 31 is not necessarily inserted and fixed into the recess. The fastener 31 may be integrally formed with the guide spring 30. Also, the recess may not be formed in the first and second side portion 35 and 36. In this case, the wiper strip 10 may be coupled to the fastener 31 after inserting and fixing the guide spring 30 into the recess formed in the side of the fastener 31, or the guide spring 30 and the wiper strip 10 may be directly coupled to each other without the separate fastener 31, or the guide spring 30 and the wiper strip 10 may be coupled to each other by the first and second spoiler 41 and 42.

A pair of first fitting recesses 34 and a pair of second fitting recesses 33 are formed in both sides of the central portion 32 of the guide spring 30 in such a manner as to be concave in the width direction of the flat wiper blade 2.

Here, the size of the second fitting recess 33 may be less than that of the first fitting recess 34. Here, the first fitting recess 34 may be located in the middle of the guide spring 30. Here, when a curvature is formed in the guide spring 30, the middle position of the guide spring 30 does not affect the stress of the guide spring 30.

Figure 5A:
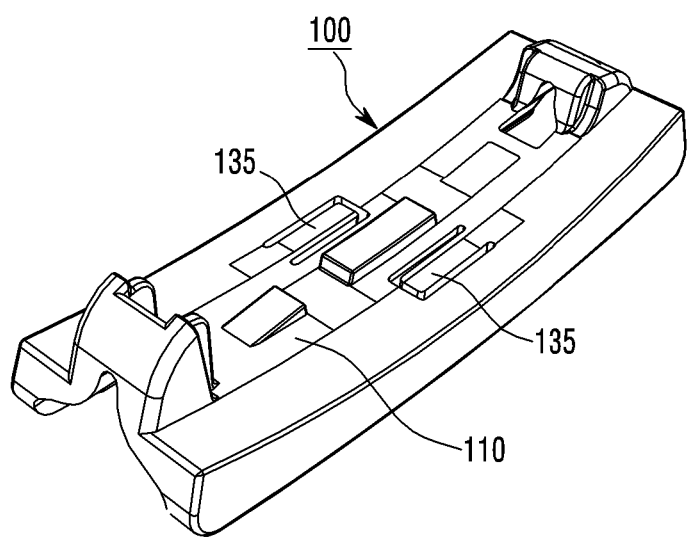
FIGS. 5a to 5c show a seating part of FIG. 2.
Figure 5B:
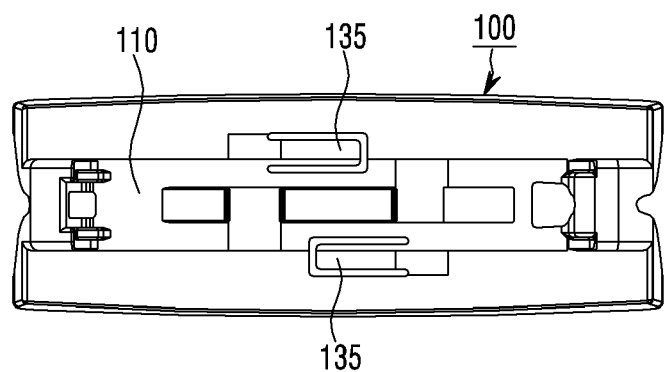
Figure 5C:
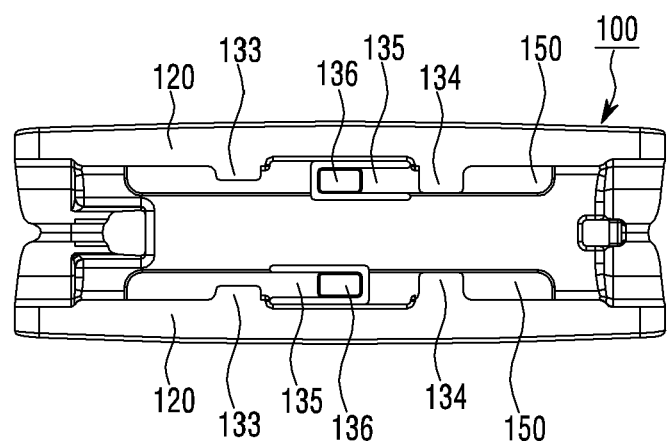

FIGS. 5a to 5c show a seating part of FIG. 2.

Specifically, FIG. 5a is a perspective view of the seating part 100. FIG. 5b is a top view of the seating part 100. FIG. 5c is a rear view of the seating part 100.

Referring to FIGS. 2, 4 and 5, the seating part 100 has a configuration for connecting the guide spring 30 with the adaptor 3. An inner surface 150 of the seating part 100 comes in contact with the guide spring 30. The top surface 110 of the seating part 100 comes in contact with the adaptor 3.

A pair of second fitting protrusions 133 is formed on one side of a bottom surface 120 of the seating part 100 and may be inserted into the second fitting recess 33 of the guide spring 30. A pair of first fitting protrusions 134 is formed on the other side of the bottom surface 120 of the seating part 100 and may be inserted into the first fitting recess 34 of the guide spring 30.

Here, the pair of the second fitting protrusions 133 protrude to face each other. The pair of the first fitting protrusions 134 also protrude to face each other. Here, the size of the second fitting protrusion 133 may be less than that of the first fitting protrusion 134. Here, the size of the first fitting protrusion 134 may be the same as that of a catching protrusion 136 of a catching portion 135.

A pair of the catching portions 135 which may be inserted and fixed into the first fitting recess 34 of the guide spring 30 are formed separately from each other in the seating part 100. The pair of the catching portions 135 may be formed to face each other. The catching portion 135 may be disposed between the first fitting protrusion 134 and the second fitting protrusion 133 and preferably may be disposed in the longitudinal direction center of the seating part 100. Also, the pair of the catching portions 135 includes the catching protrusion 136 formed to protrude downwardly.

Hereafter, how the seating part 100 and the guide spring 30 are connected with each other will be sequentially described with reference to FIGS. 5 to 7.

Figure 6A:
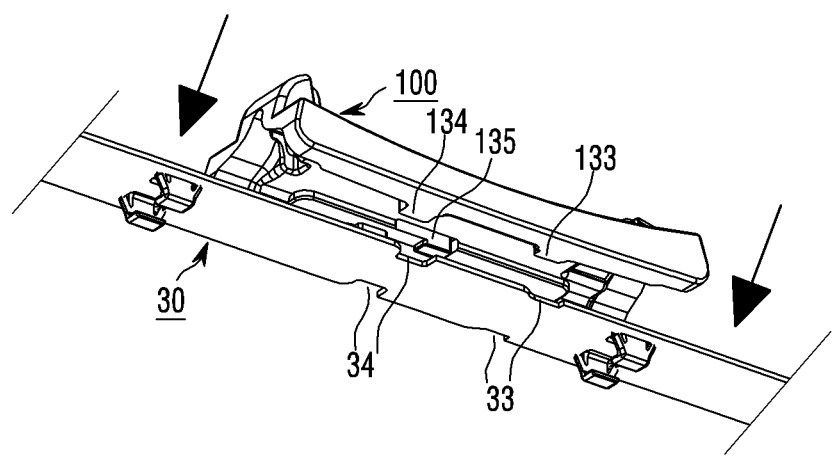
FIGS. 6a to 6c are perspective views for describing how the guide spring of FIG. 2 is coupled to the seating part of FIG. 2.
Figure 6B:
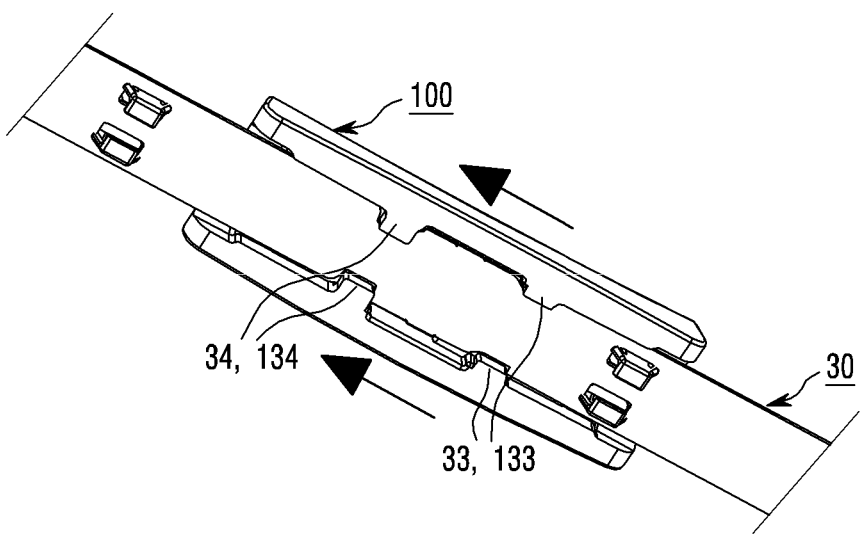
Figure 6C:
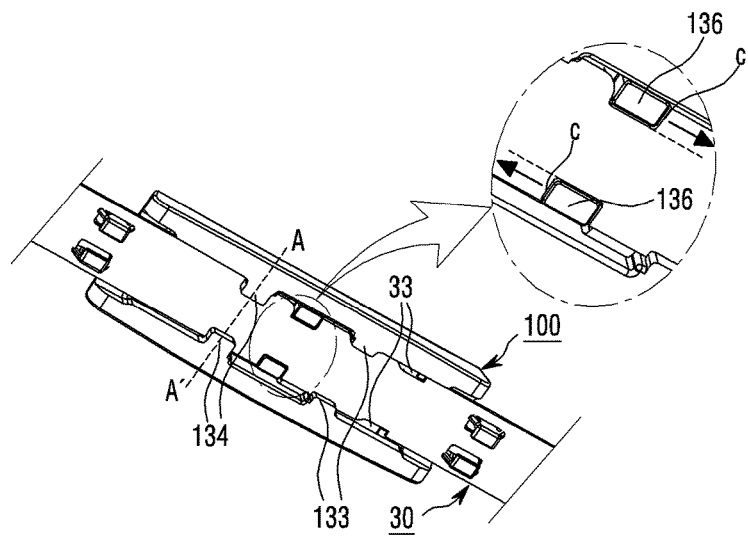
Figure 7A:
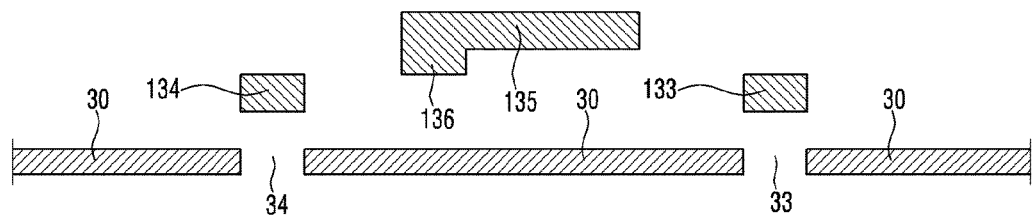
FIGS. 7a to 7c are conceptual views for describing how a catching portion of the seating part is connected with a first fitting recess of the guide spring.
Figure 7B:
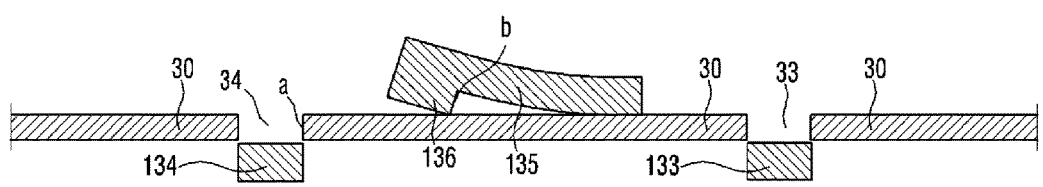
Figure 7C:
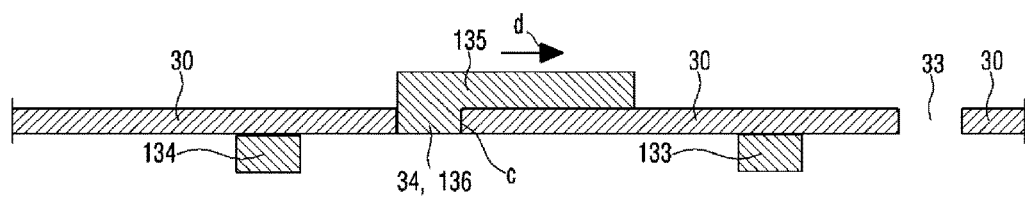

FIGS. 6a to 6c are perspective views for describing how the guide spring of FIG. 2 is coupled to the seating part of FIG. 2. FIGS. 7a to 7c are conceptual views for describing how the catching portion of the seating part is connected with the first fitting recess of the guide spring.

Specifically, FIG. 6a is a perspective view showing that a state before the seating part 100 and the guide spring 30 are connected with each other. FIG. 7a is a conceptual view for describing how the first and second fitting recesses 34 and 33, the first and second fitting protrusions 133 and 134 and the catching protrusion 136 are located relative to those of FIG. 6a.

First, referring to FIGS. 6a and 7a, after the second fitting protrusion 133 of the seating part 100 is disposed to be inserted into the second fitting recess 33 of the guide spring 30 and the first fitting protrusion 134 of the seating part 100 is disposed to be inserted into the first fitting recess 34 of the guide spring 30, the seating part 100 is moved toward the guide spring 30 or the guide spring 30 is moved toward the seating part 100. As a result, the second fitting protrusion 133 of the seating part 100 is inserted into the second fitting recess 33 of the guide spring 30, and the first fitting protrusion 134 of the seating part 100 is inserted into the first fitting recess 34 of the guide spring 30.

Here, the size of the second fitting recess 33 may be larger than that of the second fitting protrusion 133. Also, the size of the first fitting recess 34 may be larger than that of the first fitting protrusion 134.

FIG. 6b is a perspective view showing that the seating part 100 and the guide spring 30 have come in close contact with each other. FIG. 7b is a conceptual view for describing how the first and second fitting recesses 34 and 33, the first and second fitting protrusions 133 and 134 and the catching protrusion 136 are located relative to those of FIG. 6b.

Referring to FIGS. 5, 6b and 7b, under the state where the first and second fitting protrusions 134 and 133 are inserted into the first and second fitting recesses 34 and 33, when the guide spring 30 is pressed toward the seating part 100 or the seating part 100 is pressed toward the guide spring 30, the guide spring 30 is closely contacted with the inner surface 150 of the seating part 100.

Here, due to the fact that the guide spring 30 is closely contacted with the inner surface 150 of the seating part 100, the end of the catching portion 135 is elastically transformed upward by the guide spring 30. Accordingly, the catching portion 135 becomes to have downward elasticity. When the guide springs 30 are close enough to each other such that the bottom surfaces of the guide springs 30 are located on the top surfaces of the first and second fitting protrusions 134 and 133, the guide spring 30 becomes movable in a sliding manner in the longitudinal direction of the flat wiper blade 2.

FIG. 6c is a perspective view showing that the seating part 100 and the guide spring 30 have been coupled to each other. FIG. 7c is a conceptual view for describing how the first and second fitting recesses 34 and 33, the first and second fitting protrusions 133 and 134 and the catching protrusion 136 are located relative to those of FIG. 6c.

Referring to FIGS. 6c and 7c, the guide spring 30 and the seating part 100 slide in an opposite direction to each other and are coupled to each other. Under the state where the guide spring 30 and the seating part 100 are closely contacted with each other, the guide spring 30 or the seating part 100 is moved in a direction in which the catching protrusion 136 can be inserted into the first fitting recess 34, so that the catching protrusion 136 is elastically caught by the first fitting recess 34 of the guide spring 30.

The movement of the seating part 100 in a direction "d" of an arrow shown in FIG. 7c is limited by one side "c" on which one side "a" of the first fitting recess 34 comes in contact with one side "b" of the catching protrusion 136 elastically caught by the first fitting recess 34. Also, since the pair of the catching portions 135 is formed to face each other, the movement of the seating part 100 in the arrow direction is limited as shown in the enlarged view of FIG. 6c.

Accordingly, the movements of the seating part 100 in both longitudinal directions are limited.

Here, although FIGS. 6 to 7 show that the catching protrusion 136 is elastically caught by the first fitting recess 34, the present invention is not necessarily limited to this. The catching protrusion 136 may be caught by the first fitting recess 34 through a separate process.

Meanwhile, at a position where the catching protrusion 136 of the seating part 100 is elastically caught by the first fitting recess 34 of the guide spring 30, the first fitting protrusion 134 and the catching protrusion 136 are located on the side having no recess formed therein of the guide spring 30. Accordingly, the up and down movement of the seating part 100 is limited, that is to say, the movement of the seating part 100 is limited in a direction perpendicular to the longitudinal direction of the flat wiper blade 2. Here, the second fitting protrusion 133 may have a minimum size capable of limiting the up and down movement of the seating part 100. When the second fitting protrusion 133 is formed to have the minimum size, the size of the second fitting recess 33 corresponding to the second fitting protrusion 133 becomes less, so that the stress of the guide spring 30 can be minimized.

Figure 8:
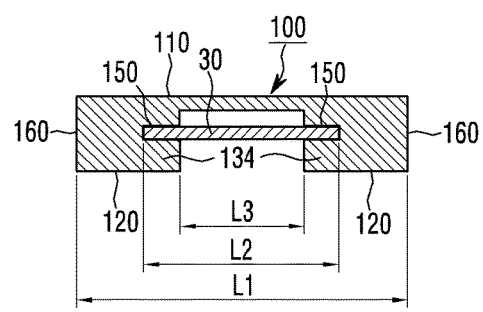
FIG. 8 is a cross sectional view taken along the line A-A' shown in FIG. 6c.

FIG. 8 is a cross sectional view taken along the line A-A' shown in FIG. 6c.

Referring to FIGS. 4 and 8, it is preferable that the interval L1 between both sides 160 of the seating part 100 is greater than the interval L2 of the central portion 32 in such a manner as to surround portions of the both sides of the central portion 32 of the guide spring 30. The interval L3 between the pair of the first fitting protrusions 134 is formed less than the interval L2 of the central portion 32.

Figure 9:
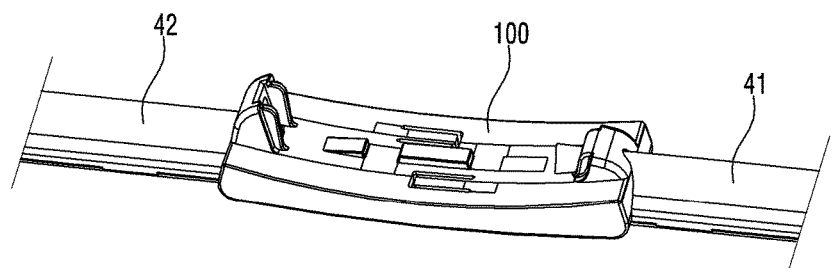
FIG. 9 is a perspective view showing that the seating part of FIG. 2, the guide spring of FIG. 2 and a spoiler of FIG. 2 have been coupled to each other.

FIG. 9 is a perspective view showing that the seating part of FIG. 2, the guide spring of FIG. 2 and the spoiler of FIG. 2 have been coupled to each other.

Referring to FIGS. 2, 4 and 9, the first side portion 35 and the second side portion 36 of the guide spring 30 are coupled to the first spoiler 41 and the second spoiler 42. There is no limit to the method for coupling the first side portion 35 and the second side portion 36 to the first spoiler 41 and the second spoiler 42. Since it can be considered that the coupling may be performed by publicly known arts, a detailed description thereof will be omitted.

When the first spoiler 41 and the second spoiler 42 are coupled to the guide spring 30 after the seating part 100 is coupled to the guide spring 30, either the first spoiler 41 or the second spoiler 42 additionally limits the longitudinal movement of the seating part 100, so that the seating part 100 can be more prevented from being separated.

As such, referring to FIGS. 1 to 9, through the minimization of the number of the recesses of the central portion of the guide spring 30 according to the embodiment, it is possible to reduce the stress loss when the curvature is formed in the guide spring 30.

Further, in the guide spring 30 of the flat wiper blade 2 according to the embodiment, since the first fitting protrusion 134 may be inserted into the first fitting recess 34 as well as the catching protrusion 136 of the seating part 100 may be elastically caught by the first fitting recess 34, it is not necessary to form a separate recess or hole for the catching protrusion 136. As a result, it is possible to accomplish the simplification of the manufacturing process and manufacturing cost reduction.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. That is, the components described in detail in the embodiments of the present invention may be modified. Further, differences due to the modification and application should be construed as being included in the scope and spirit of the present invention, which is described in the accompanying claims.

What is claimed is:

1. A flat wiper blade comprising:
a wiper strip which wipes a wiping surface;
a guide spring which supports the wiper strip and comprises a pair of first fitting recesses formed in longitudinal sides of the guide spring;
a seating part comprising a pair of first fitting protrusions and a pair of catching portions; and
a first spoiler and a second spoiler coupled to the guide spring,
wherein the seating part is coupled to the guide spring in a removable manner,
wherein each of the pair of catching portions comprises a catching protrusion at an end
wherein the catching protrusion of one of the pair of catching portions points in a first direction and the catching protrusion of the other of the pair of catching portions points in a second direction that is opposite to the first direction,
wherein, when the pair of first fitting protrusions is fitted into the pair of first fitting recesses and the guide spring comes in contact with the seating part, the end with the catching protrusion in each of the pair of catching portions is elastically deformed upward, and
wherein, when either the seating part or the guide spring slides in a longitudinal direction and each of the pair of catching protrusions is elastically caught by each of the pair of first fitting recesses, each of the pair of first fitting protrusions is located at portions of the guide spring without the first fitting recesses.

2. The flat wiper blade of claim 1, wherein the pair of first fitting recesses is located in the middle of the guide spring.

3. The flat wiper blade of claim 1, wherein the seating part further comprises a pair of second fitting protrusions, and wherein the guide spring further comprises a pair of second fitting recesses into which the pair of second fitting protrusions is inserted.

4. The flat wiper blade of claim 3, wherein each of the pair of second fitting recesses is smaller than each of the pair of first fitting recesses.

5. The flat wiper blade of claim 1, wherein the seating part further comprises a pair of second fitting protrusions 133, and wherein the guide spring further comprises a pair of second fitting recesses 33 into which the pair of second fitting protrusions 133 is inserted, and wherein a size of each of the pair of second fitting protrusions 133 is smaller than each of the pair of first fitting protrusion 1311.

6. The flat wiper blade of claim 1, wherein a size of each of the pair of catching protrusions is the same as a size of each of the pair of first fitting protrusions.

* * * * *

UNITED STATES PATENT AND TRADEMARK OFFICE
CERTIFICATE OF CORRECTION

PATENT NO. : 9,714,008 B2  
APPLICATION NO. : 14/300956  
DATED : July 25, 2017  
INVENTOR(S) : Jae-Hyuck An et al.

Page 1 of 1

It is certified that error appears in the above-identified patent and that said Letters Patent is hereby corrected as shown below:

In the Claims

- Column 8, Claim 5, Line 62: delete "133" after "protrusions"
- Column 8, Claim 5, Line 64: delete "33" after "recesses"
- Column 8, Claim 5, Line 65: delete "133" after "protrusions"
- Column 8, Claim 5, Line 65: delete "a size of" after "wherein"
- Column 8, Claim 5, Line 66: delete "133" after "protrusions"
- Column 8, Claim 5, Line 67: delete "1311" after "protrusions"

Signed and Sealed this  
Third Day of March, 2020

Andrei Iancu  
*Director of the United States Patent and Trademark Office*